United States Patent

Trok

[15] 3,665,290

[45] May 23, 1972

[54] ELECTRONIC CONVERTER

[72] Inventor: Benjamin Trok, Johanneshov, Sweden

[73] Assignee: International Standard Electric Corporation, New York, N.Y.

[22] Filed: Apr. 28, 1971

[21] Appl. No.: 138,277

Related U.S. Application Data

[63] Continuation of Ser. No. 872,113, Oct. 29, 1969, abandoned.

[30] Foreign Application Priority Data

Nov. 15, 1968 Sweden..............................15.506/68

[52] U.S. Cl.................................................321/47, 330/100

[51] Int. Cl.........................................................H02m 7/20

[58] Field of Search.......................321/47; 324/119; 330/100

[56] References Cited

UNITED STATES PATENTS 3,280,342 10/1966 Ashley..............................330/100 X 3,165,694 1/1965 Young..............................324/119 X 3,360,727 12/1967 Justice..............................324/119 X 3,381,203 4/1968 Mitchell..............................321/47 X 3,411,066 11/1968 Bravenec..............................321/47

FOREIGN PATENTS OR APPLICATIONS

N241,528 7/1965 Austria..............................321/47

1,020,154 2/1966 Great Britain..............................324/119

*Primary Examiner*—William M. Shoop, Jr.

*Attorney*—Remsen, Jr., Baum, Hemminger, Lantzy & Kristofferson

[57] ABSTRACT

A circuit including an amplifier and a transistor for rectification including a feedback path to maintain the output voltage proportional to the input voltage. The amplifier also may include a feedback resistor to maintain the transistor at cut-off in the absence of an AC input signal.

7 Claims, 2 Drawing Figures

Patented May 23, 1972 3,665,290

Inventor
BENJAMIN (nmn) TROK
By [signature]
Attorney

ELECTRONIC CONVERTER

This application is a continuation of abandoned application, Ser. No. 872,113, filed Oct. 29, 1969, by Benjamin Trok for Electronic Converter. Said abandoned application was not abandoned until after the filing of this application. Thus, the benefit of the filing date of said abandoned application is hereby claimed for this application. Under the provisions of Title 35, United States Code, Section 119, claim is hereby made for priority based on the first filing of this application, Ser. No. 15506/68, filed Nov. 15, 1968, in Sweden.

BACKGROUND OF THE INVENTION

This invention relates to rectifying apparatus having a low threshold value and high stability.

The device of the present invention is particularly well suited for use in the fields of measuring and control.

Previously known rectifying apparatus having low threshold values have disadvantages, such as temperature fluctuations and requirements of accurate adjustment which result in substantial problems in manufacture.

SUMMARY OF THE INVENTION

In accordance with the device of the present invention the above-described and other disadvantages of the prior art are overcome by providing an amplifier and rectifying means which are connected in series. A first negative feedback circuit may be connected to the amplifier input. The first feedback circuit is intended to stabilize the operating point of the amplifier and to bias the rectifying means. A second negative feedback circuit is connected to the amplifier. The second feedback circuit is intended to insure linearity between the rectified output voltage and the input voltage to the amplifier with the second feedback circuit being maintained inactive in the quiescent state, i.e., when there is no alternating voltage at the input.

The above-described and other advantages of the invention will be better understood from the following description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
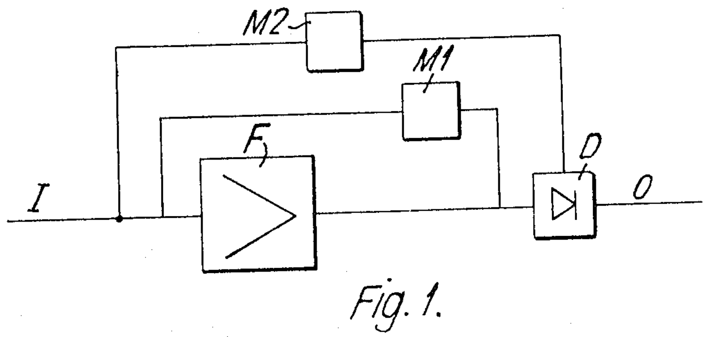
FIG. 1 is a block diagram of a rectifying apparatus in accordance with the device of the present invention.

Reference is first made to FIG. 1. The low threshold value in accordance with the device of the present invention results from the comparatively high alternating current amplification in an amplifier F. The operating point of the rectifying apparatus is stabilized by means of a negative feedback circuit M1. When the output voltage of the amplifier F is sufficiently high, rectifying means D will be conductive; and a rectified voltage will occur at the output O of the apparatus. Good linearity between the alternating voltage supplied at the input I and the direct voltage occurring at the output O is attained in a considerable dynamic region by means of the negative feedback circuit M2 which only operates when rectifying means D is conductive.

Figure 2:
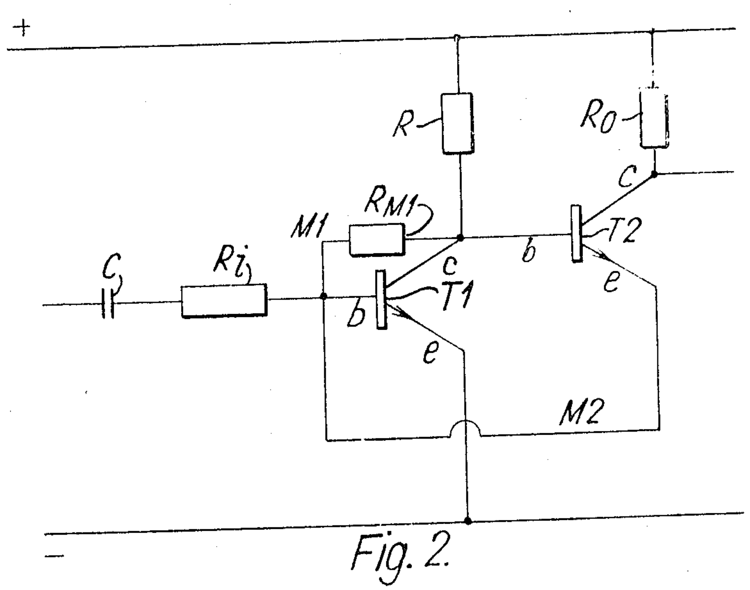
FIG. 2 is a schematic diagram of a specific embodiment of the invention.

The invention is illustrated additionally in FIG. 2 in a simple, practical device having only two transistors. The amplifier F of FIG. 1 has its counterpart in a transistor stage comprising the transistor T1 in FIG. 2. A negative feedback circuit M1 is connected between the collector $T1_c$ of transistor T1 and its base $T1_b$. The base $T1_b$ is intended for an input signal and has the object of maintaining collector $T1_c$ stable with respect to direct voltage. An input capacitor C and an input resistor $R_i$ are connected in series to the base $T1_b$. The supply voltage of transistor T1 is applied between emitter $T1_e$ and collector $T1_c$, with the collector being provided with its voltage over a resistor R. The voltage between emitter $T1_e$ and base $T1_b$ is substantially stable. The voltage of collector $T1_c$ should insignificantly exceed the voltage of base $T1_b$. By means of the resistor $R_{M1}$, included in the negative feedback circuit M1, transistor T1 is provided with an insignificant base current $I_b$. Therefore, the voltage drop over resistor $R_{M1}$ will be $R_{M1} \times I_b$. The voltage over collector $T1_c$ will be equal to the base-emitter voltage plus the voltage drop over resistor $R_{M1}$, i.e., $O_{be} + R_{M1} \times I_b$, which voltage will be substantially constant.

The base $T2_b$ of an additional transistor T2 is connected to the collector $T1_c$ of transistor T1. The emitter $T2_e$ of transistor T2 is coupled in the manner of negative feedback over a negative feedback circuit M2 to the base $T1_b$ of transistor T1. Thus, in the device of the present invention, there are two feedback circuits. One of these feedback circuits, M1, is adapted to maintain the collector stable from a direct voltage point of view and simultaneously to maintain the voltage between the base $T2_b$ and emitter $T2_e$ of transistor T2 sufficiently low for transistor T2 to be cut off in its quiescent state, that is, when there is no alternating voltage at the input I. Whereas, the second negative feedback circuit, M2, which does not become active until transistor T2 becomes conductive, is adapted to provide linearity between the supplied alternating voltage and the direct voltage that is derived.

In FIG. 2, the collector $T2_c$ of the second transistor T2 is connected to the supply voltage over an output resistor $R_o$.

Normally, that is, when no alternating voltage is applied to the input I, a direct voltage equal to $R_{M1} \times I_b$ occurs between the base $T2_b$ and the emitter $T2_e$ of transistor T2. This voltage difference between the base $T2_b$ and the emitter $T2_e$ of transistor T2 shall not be sufficiently great to permit said transistor T2 to begin to conduct. Thus, transistor T2 is entirely cut off. Consequently, the collector current is zero, and the voltage drop over resistor $R_o$ is also zero.

When an alternating voltage signal is supplied to the base $T1_b$ of transistor T1 during a positive half-cycle, transistor T1 will bottom; and transistor T2 will be maintained cut off, as the voltage between its base $T2_b$ and emitter $T2_e$ consequently will decrease additionally. During the positive half-cycle of the alternating voltage input signal, no output signal will therefore be derived. Under the negative half-cycle, the voltage of collector $T1_c$ will increase until transistor T2 begins to conduct; and negative feedback circuit M2 begins to function. This will occur even at a very low input signal because of the amplification in transistor T1. The amplification is determined essentially by the ratio of the resistor $R_i$ connected at transistor base $T1_b$ to the resistor $R_{M1}$ of negative feedback circuit M1. When the collector $T1_c$ of transistor T1 becomes positive, transistor T2 will conduct a current. Negative feedback to the base $T1_b$ of transistor T1 over negative feedback circuit M2 will now occur. The transistor current in transistor T2 will become essentially equal to the input current of transistor T1.

If resistor $R_o$ is chosen equal to resistor $R_i$, the voltage drop of resistor $R_o$ will be equal to the voltage drop in resistor $R_i$ when the same current occurs in resistors $R_i$ and $R_o$, respectively, during the negative half-cycle at the input. If the resistance of resistor $R_o$ is selected greater than the resistance of resistor $R_i$, amplification may be achieved. However, in this case, it is important that the half-cycles of the output voltage be directly proportional to the input voltage. This linearity is insured by means of negative feedback circuit M2.

In the preferred apparatus disclosed above, the rectified alternating voltage occurring at the output may be filtered by means of a capacitor. By coupling the capacitor in parallel to the resistor $R_o$, a direct voltage that is proportional to the rectified mean value of the supplied alternating voltage is obtained. By connecting the capacitor (not shown) between the collector $T2_c$ and emitter $T2_e$ of transistor T2, a direct voltage that is proportional to the peak voltage of the supplied alternating voltage is obtained.

Modifications of the rectifying apparatus disclosed above are possible within the scope of the present invention. For instance, the resistor in the negative feedback circuit M1 may be divided into two resistors that are connected in series, with the junction between the latter being decoupled to ground over a capacitor with respect to alternating voltage. This will provide higher amplification in the amplifier and an additional decrease of the threshold value of the rectifying apparatus.

What is claimed is:

1. An A.C. to D.C. converter comprising: an inverting type amplifier; means including at least positive and negative D.C. input leads connected to said amplifier in a manner to supply a D.C. operating voltage thereto, said amplifier having an input circuit connected from an A.C. source of potential and also having a connection with one of said D.C. input leads, said amplifier including at least a three electrode device, one of said electrodes being a control electrode, said input circuit being connected between said A.C. source and said control electrode, said amplifier having an output; a first transistor having a collector, an emitter, and a base; a first resistor connected from said first transistor collector to the other of said leads, said first transistor base being connected from said amplifier output; feedback means connecting said first transistor emitter to said device control electrode, said first transistor emitter being connected only to said device control electrode through said feedback means as aforesaid and not being electrically connected to any other structure; and a second resistor connected from said control electrode to said amplifier output, said second resistor having a resistance such that said first transistor is cut off when said A.C. source is disconnected from said input circuit.

2. The invention as defined in claim 1, wherein said input circuit includes a capacitor and a third resistor connected in series, said capacitor having one electrode connected to said A.C. source and another electrode connected to one end of said third resistor, the other end of said third resistor being connected to said control electrode, said amplifier including a second transistor having a collector, an emitter and a base, said control electrode being said base, a fourth resistor connected from said second transistor collector to said other lead; said first transistor base being connected to said second transistor collector, said second resistor being connected from said second transistor collector to said second transistor base, said feedback means being the only means connecting said first transistor emitter and said device control electrode, said feedback means consisting solely of a single highly conductive lead connected from said first transistor emitter to said second transistor base, said first and second transistors both being of the same conductivity type.

3. The invention as defined in claim 1, wherein said amplifier includes at least a second transistor of the same conductivity type as that of said first transistor.

4. The invention as defined in claim 3, wherein said feedback means is a highly conductive lead.

5. The invention as defined in claim 1, wherein said feedback means is a highly conductive lead.

6. The invention as defined in claim 5, wherein said amplifier includes a second transistor having a collector, an emitter, and a base, a third resistor connected from said second transistor collector to said other lead, said first transistor base being connected from said second transistor collector, said first transistor emitter being connected to said second transistor base by said highly conductive lead, said second resistor being connected between said second transistor base and collector, said control electrode being said second transistor base.

7. The invention as defined in claim 1, wherein said amplifier includes a second transistor having a collector, an emitter and a base, a third resistor connected from said second transistor collector to said other lead, said first transistor base being connected from said second transistor collector, said first transistor emitter being connected to said second transistor base, said second resistor being connected between said second transistor base and collector, said control electrode being said second transistor base.

* * * * *